Figure 1:
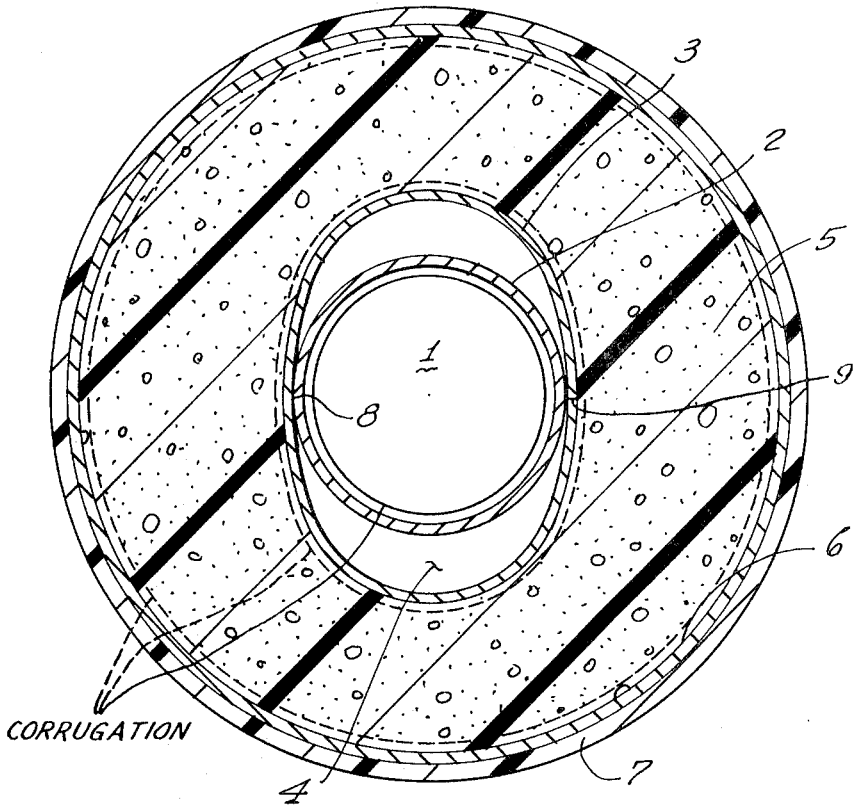

United States Patent

[11] 3,626,987

[72] Inventor Herbert Bittner
am Heidekamp, Germany
[21] Appl. No. 861,983
[22] Filed Sept. 29, 1969
[45] Patented Dec. 14, 1971
[73] Assignee Kabel-und Metallwerke Aktiengesellschaft
Hannover, Postfach, Germany
[32] Priority Oct. 3, 1969
[33] Germany
[31] P 18 00 863.4

[54] COAXIAL PIPE SYSTEM WITH THERMAL INSULATION
9 Claims, 1 Drawing Fig.

[52] U.S. Cl..................................... 138/114,
138/38, 138/148, 138/149, 165/154
[51] Int. Cl..................................... F16l 9/18,
F16l 11/12

[50] Field of Search............................................ 138/38,
111, 114, 115, 148, 149; 245/154; 165/154, 156, 164

[56] References Cited
UNITED STATES PATENTS
2,330,966 10/1943 Gottwald..................... 138/149
2,823,701 2/1958 Burk............................. 138/149 X
FOREIGN PATENTS
168,833 7/1934 Switzerland.................. 165/154
624,015 2/1963 Belgium ....................... 165/177

Primary Examiner—Herbert F. Ross
Attorney—Smyth, Roston & Pavitt

ABSTRACT: A pipe system is disclosed in which there is an inner, an outer, and an intermediate pipe, the latter having elliptical cross section for conduction of heating or cooling medium around the inner pipe.

PATENTED DEC 14 1971　　　　　　　　　　　3,626,987

CORRUGATION

CORRUGATION

INVENTOR:
Herbert Bittner

ATTORNEYS

COAXIAL PIPE SYSTEM WITH THERMAL INSULATION

The present invention relates to a coaxial pipe system in which coaxially positioned pipes are thermally insulated from each other by means of a foamed plastic.

Occasionally, a project or installation requires transportation of liquidous or gaseous material through pipes whereby the fluid to be conducted is either warmer or colder than the environment. For transportation of a relatively cold material pipe systems have become known, for example, in which a first, inner pipe provides the conduit for the fluid to be transported, and a second or outer pipe with larger diameter is concentrically positioned around the inner pipe and receives the same. The space in between the two pipes can be filled with a cooling medium. In order to maintain the relative position between inner and outer pipes, a spacer is provided in the ring space between the two pipes.

Supplemental being heating is known for systems using smooth metallic pipes, whereby a heating conductor runs either axis parallel or extends helically around the pipe to be heated. The heating conductor is retained upon the metallic pipe by means of a foil or cover wound around pipe and heating conductor. A disadvantage of such pipes is to be seen in that they are not flexible and, therefore, cannot be transported without difficulties. Another device is known wherein the electrical heating conductor is provided in the groove of a corrugated metallic hose.

It is an object of the present invention to provide a new solution to the problem of heating or cooling of fluid to be transported in a pipe system which solution differs from heating and cooling arrangements as they have been used heretofore. In accordance with the present invention, and generally speaking, it is suggested to provide, for example, two pipes having different, differently elliptical cross section, one inside the other, whereby the inner pipe serves as conduit proper for the fluid to be conducted and heat or cooled (heat-exchange), while the space between the pipes serves as conduit for the heating or cooling medium. This pipe arrangement is preferably additionally received by another pipe with thermal insulation interposed. For example, a pipe with elliptical cross section is disposed around a pipe with circular cross section for the medium to be heated or cooled, as the case may be, and the space between inner, circular pipe and enveloping elliptical pipe serves as conduit for the heating or cooling medium. The outer pipes may receive more than one inner pipe.

An arrangement of this type has the advantage that the liquidous of gases heating and cooling medium flows in and through the space between the elliptically shaped pipe, and the inner circular conductor proper for the medium to be heated or cooled, so that the central conduit is practically enveloped on all sides by the heating or cooling medium. Accordingly, satisfactory conditions for sufficient heat transport in both directions is established. Another advantage is to be seen in that a spacer is not needed because, generally speaking, the different ellipticity of the two pipes serves directly for obtaining positioning of the two pipes to each other. If the outer diameter for the inner circular pipe is equal or at least approximately equal to the small axis of the ellipsis of the elliptical pipe, then the two pipes are actually (or substantially) coaxially positioned, coaxial to refer to the relationship of the longitudinal axes of the pipes.

In accordance with another feature of elliptic pipe, as well as the inner and the outer pipe, are provided with corrugation, preferably helical corrugation so that the entire pipe system becomes flexible. The elliptic pipe is preferably made of metal and here particularly of copper. Copper is particularly suitable because it is rather corrosionproof. Nevertheless, in some cases it was found to be of advantage of employ a plastic pipe using, for example polytetrafluoroethylene. Plastics on that basis are highly resistant against most materials. Another advantage of a plastic pipe is to be seen in that is is rather heatproof so that it is particularly suitable for conducting heating fluid.

In order to increase the mechanical resistance, it may be of advantage to use a metallic armoring of the plastic pipe. The elliptic pipe particularly when made of metal, is actually made from a metalic tape which in longitudinal direction, and in a continuous process is shaped to a pipe, longitudinally welded, subsequently corrugated, and finally deformed to assume elliptic configuration.

Figure 2:
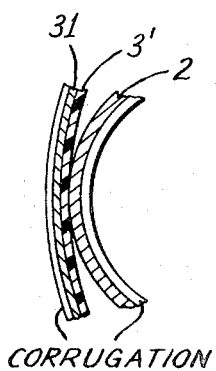

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawing, in which:

FIG. 1 illustrates a cross-sectional view through a pipe system in accordance with the preferred embodiment of the present invention; and FIG. 2 illustrates cross section of a modification.

Turning now to the detailed description of the drawing the figure illustrates an inner, preferably corrugated, conduit or pipe 2 through which runs a medium 1 to be cooled or to be heated. The medium such as a fluid flows, of course, in a direction transverse to the plane of the drawing. Pipe 2 is enveloped by a pipe 3 having elliptical cross section. The space between pipes 2 and 3 conducts the cooling or heating medium 4, as the case may be. In the preferred form and particularly in case pipe 2 is corrugated, the elliptically formed pipe 3 is likewise corrugated. Pipe 3 was made from a tape shaped into a pipe and longitudinally welded, as indicated by 9.

Elliptical pipe 3 is maintained in relation to inner pipe 2, particularly by operation of its ellipticity in that the small axis of the ellipse outlining the inner contour of the pipe matches the outer diameter of circular pipe 2. In order to provide thermal insulation, elliptical pipe 3 is enveloped by a foamed plastic layer 5, preferably comprising foamed polyurethane. In order to protect the arrangement and particularly the plastic layer 5 against mechanical damages layer 5 is received by a, preferably, likewise corrugated metallic sleeve or pipe 6. In order to protect metallic sleeve or pipe 6 against corrosion, a layer of polyethylene 7 is sprayed upon the outer surface of sleeve 6.

In the following a further improvement is described which is particularly important in case the inner pipe 2 is provided to receive or to establish a superconductive, hollow conductor. In this case, for example, the metallic inner pipe 2 is made of copper. This is not the exclusive employment of copper for such a pipe system generally, but for this field of employment it is rather advisable to use copper. Now, however, electric contact making between inner pipe 2 an elliptic pipe 3 is to be avoided, and for this a thin insulating layer 8 is provided either on the outer surface of pipe 2, or on the inner surface of pipe 3. The space between inner pipe 2 and elliptic pipe 3, is, in this case, filled with a cooling medium which permits very low temperatures, for example, liquid helium. As stated and as shown in FIG. 2, an elliptic pipe 3' can be made from plastic with armoring 31.

The invention is not limited to the embodiments described above, but all changes and modifications thereof not constituting departures from the spirit and scope o the invention are intended to be included.

I claim:

1. Flexible pipe system having an inner and outer pipe, the outer pipe coaxially arranged around the inner pipe, there being thermally insulating material on the inside of the outer pipe, the improvement for providing flow space for two fluids and for providing for heat exchange between the two fluids, comprising, an intermediate pipe enveloping the inner pipe in coaxial relation and spaced from the outer pipe, at least some of the pipes made of metal and each pipe being corrugated to render the pipe system flexible, the cross section of the intermediate pipe being elliptical and engaging the inner pipe along the minor axis of the elliptical pipe, the interior of the inner pipe and the space between inner pipe and intermediate pipe being accessible and provided for conduction of the fluids there being heat transport between the fluids through the intermediate pipe; and thermally insulating foam filling the space between the outer and the intermediate pipes, the latter pipe being completely surrounded by the foam.

2. Pipe system in accordance with claim 1, inner pipe having circular cross section, the intermediate pipe having elliptical cross section, the small axis of the elliptic contour of said inner pipe being at least approximately equal to the outer diameter of the inner pipe.

3. Pipe system in accordance with claim 1, the pipe with elliptic cross section being made of metal.

4. Pipe system in accordance with claim 3, the metal being copper.

5. Pipe system in accordance with claim 1, the pipe with elliptic cross section being made of plastic.

6. Pipe system in accordance with claim 5, the plastic having as a base polytetrafluoroethylene.

7. Pipe system in accordance with claim 5, said pipe with elliptic cross section having metal armoring.

8. Pipe system in accordance with claim 1, the pipe with elliptic cross section established from a metallic tape, formed into a pipe and having longitudinal welding seam along the abutting edges and deformed to assume elliptic cross section.

9. Pipe system in accordance with claim 7, the pipe with elliptic cross section being corrugated.

* * * * *